Aug. 9, 1960 W. L. GARBERDING 2,948,540
AUTOMATIC WORK GRIPPING CHUCK
Filed Jan. 18, 1957 3 Sheets-Sheet 3
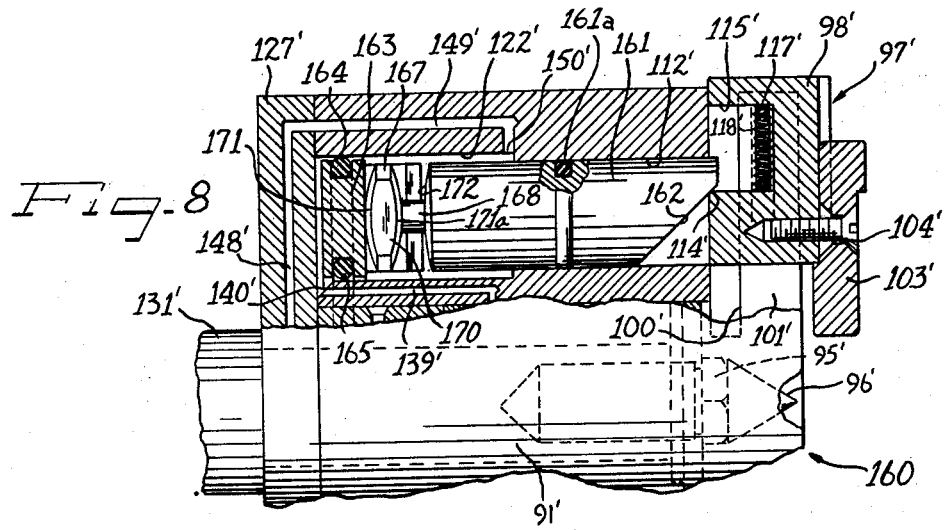
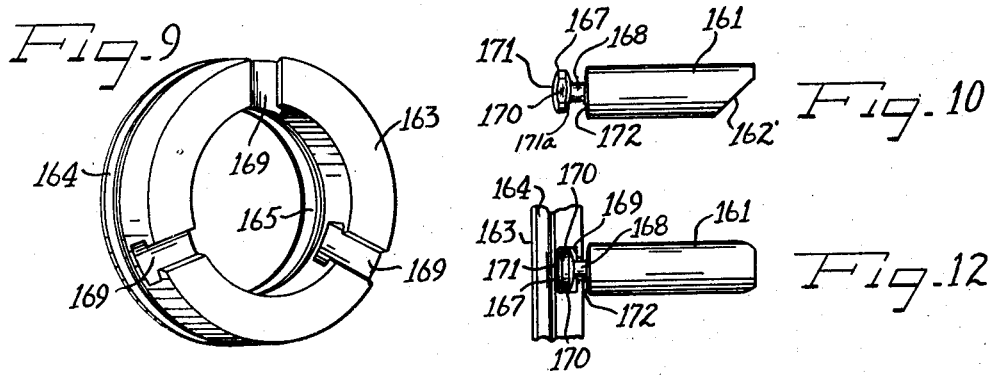
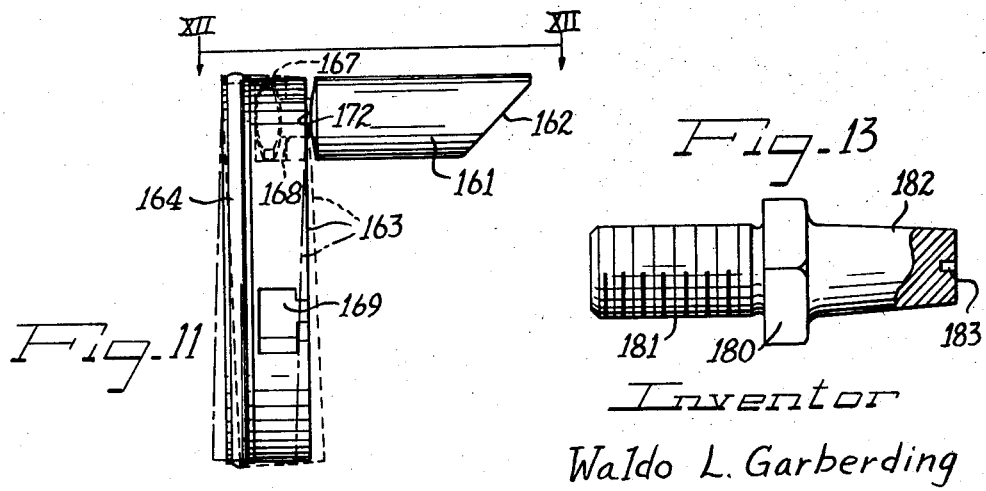
Inventor
Waldo L. Garberding United States Patent Office 2,948,540
Patented Aug. 9, 1960

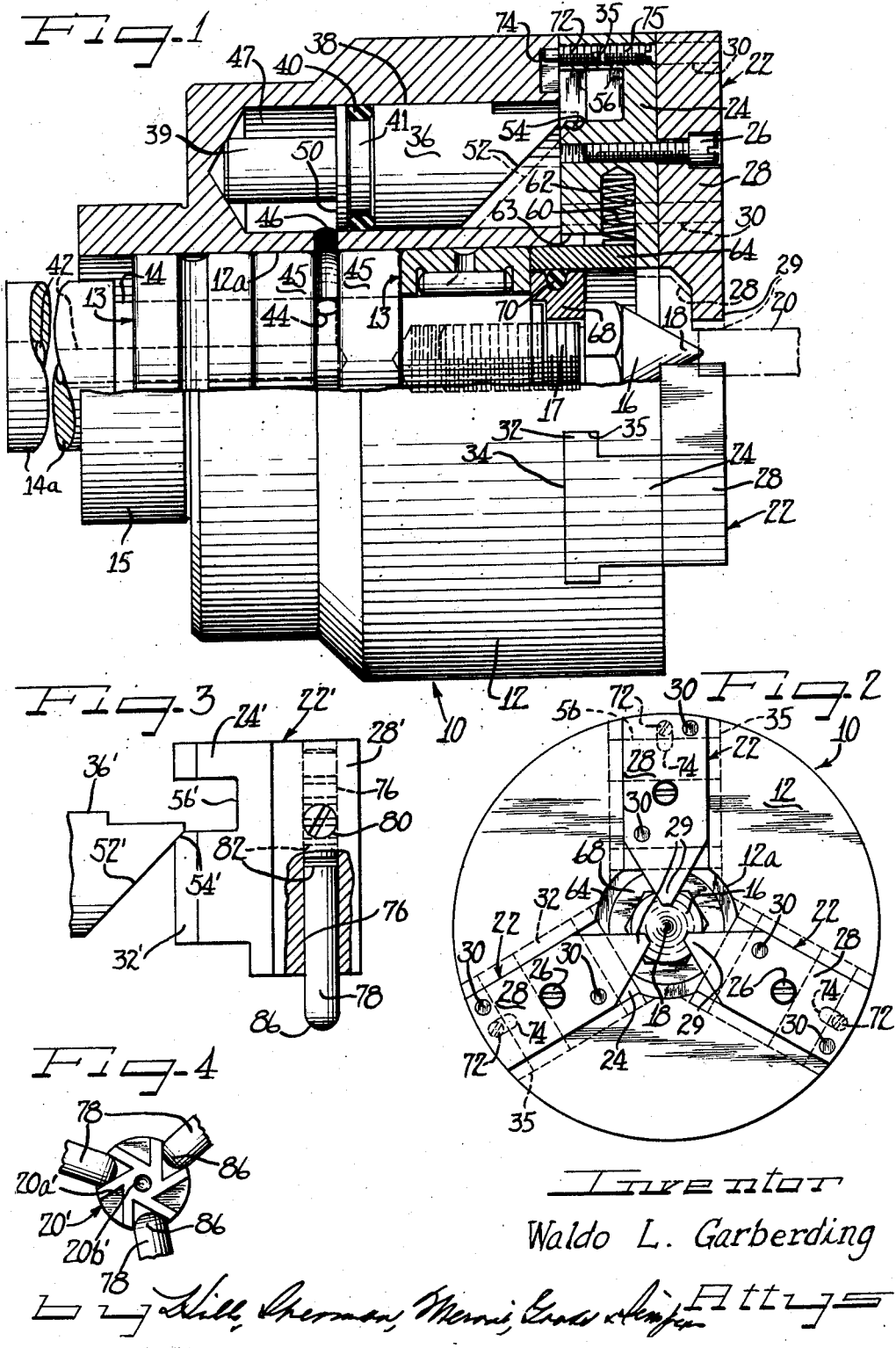
Aug. 9, 1960     W. L. GARBERDING     2,948,540
AUTOMATIC WORK GRIPPING CHUCK
Filed Jan. 18, 1957     3 Sheets-Sheet 1
Inventor
Waldo L. Garberding

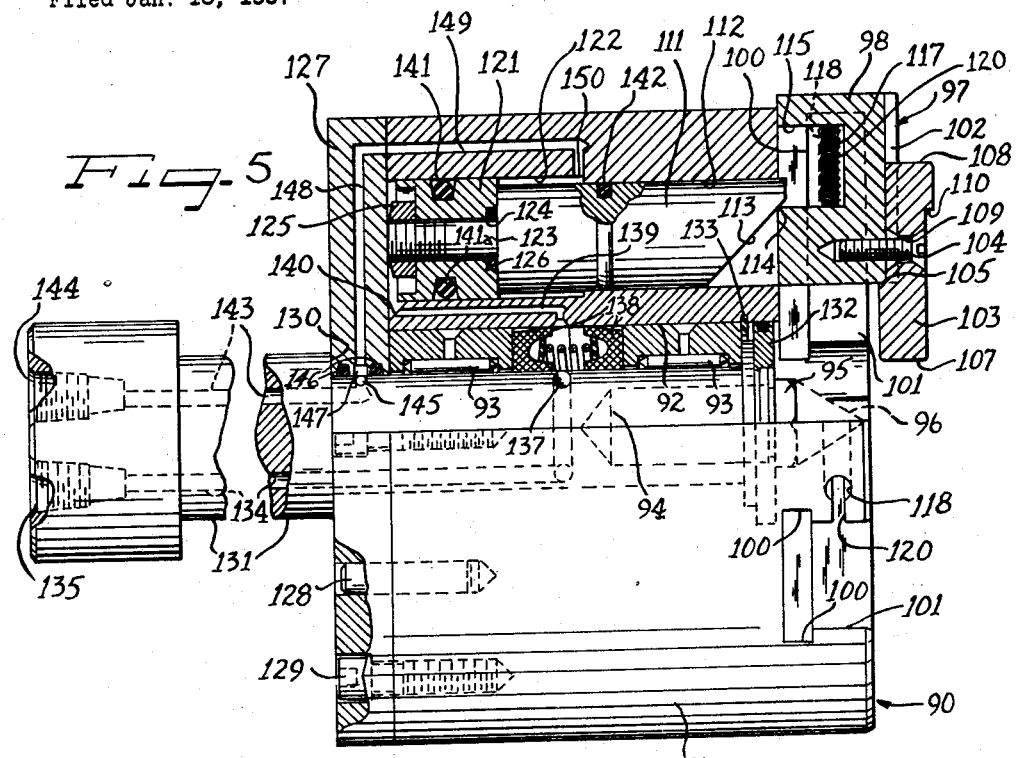
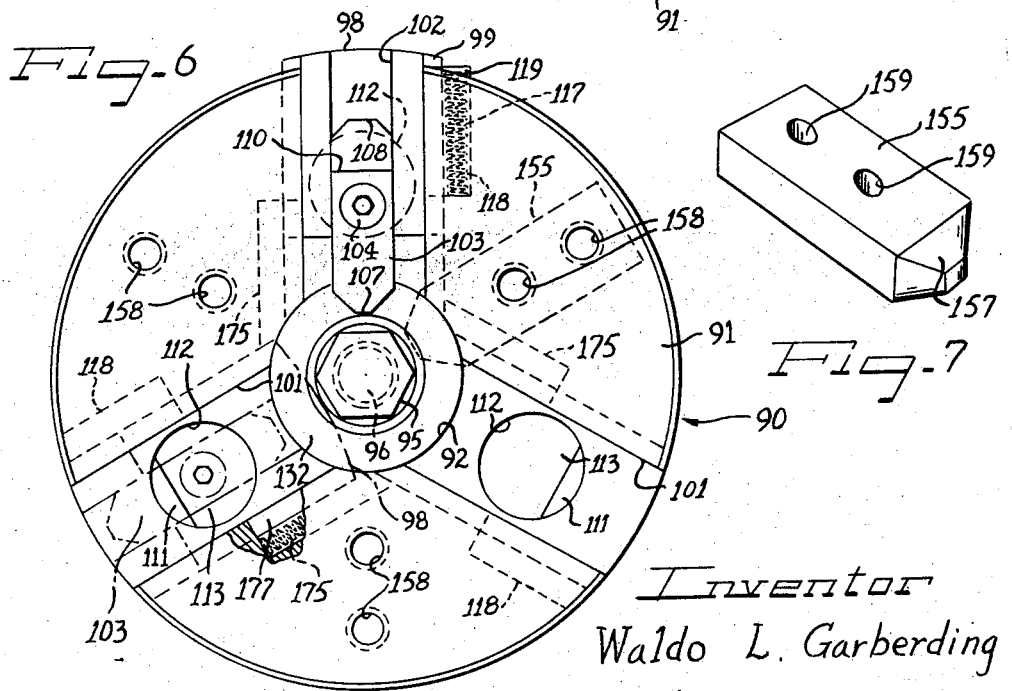

2,948,540

AUTOMATIC WORK GRIPPING CHUCK

Waldo L. Garberding, Rte. 176 and Bradley Road, Libertyville, Ill.

Filed Jan. 18, 1957, Ser. No. 634,936

13 Claims. (Cl. 279—4)

The present invention relates to improvements in machine tool chucks of the type adapted to be mounted on power driven lathes, grinders, and the like, and more particularly concerns such chucks which may be conveniently and efficiently equipped with fixed centering means to accommodate work pieces provided with fixed centers.

In the machining, forming, grinding, or the like, of certain types of work pieces and more especially work pieces that may vary dimensionally or as to concentricity from piece-to-piece, substantial production problems are encountered. These include the difficulty of uniformly gripping the work piece by the chuck jaws and yet maintain a predetermined concentricity of work center with chuck center, the attainment of uniform firmness of grip of the chuck jaws and thus avoidance of gouging or scarring by any of the jaws, the usual excessive time required for setting up for a production run, especially for low volume production, and relatively slow capability of chucking and releasing the work, that is excessive consumption of time in this phase of operation and thus relatively low production rate.

An example of work pieces that are subject to the foregoing production problems are rotary cutting tools such as reamers which often develop some eccentricity or irregularity incident to heat treatment and which must therefore be further worked or reworked after such heat treatment. Nevertheless, it is essential that the shafts and heads of the reamers be concentric. It is therefore customary to effect flute sharpening of the reamer heads and outside diameter grinding of the reamer shanks after heat treatment in order to attain such concentricity.

It is accordingly an important object of the present invention to provide machine tool chucking structure provided with novel combination fixed center and self-adjusting gripping jaw means, especially suitable for handling work in which there is runout or undesirable eccentricity.

Another object of the invention is to provide chuck structure of the kind mentioned which is simple and efficient in structure and which may be quickly set up for any of a substantial range of work piece sizes.

A further object of the invention is to provide an improved chuck structure with fluid operated chuck driving means and provided with novel combination chuck shaft, work supporting center and fluid supply means.

Still another object of the invention is to provide improved self-compensating, automatic chuck structure.

Yet another object of the invention is to provide in a machine tool chuck novel means for rapid set-up for various size work pieces.

A still further object of the invention is to provide an improved machine tool chuck which is readily convertible to handle work pieces by either inside diameter or outside diameter gripping or chucking of the work piece.

Other objects, features and advantages of the present invention will be readily apparent from the following description of several illustrative embodiments thereof, taken in conjunction with the accompanying drawings, in which:

Figure 1 is a side elevational view of a chuck structure embodying features of the present invention, with certain parts broken away and in section for purposes of illustration;

Figure 2 is a jaw end elevational view of the chuck structure of Figure 1;

Figure 3 is a fragmentary side elevational view, with certain portions broken away and in section, showing a modified chuck jaw arrangement with an associated operating piston;

Figure 4 is a fragmentary end elevational view showing the head end tip of a work piece such as a reamer gripped by chuck jaws of the type shown in Figure 3;

Figure 5 is a fragmental side elevational view, partially broken away and in section, of a modified chuck construction;

Figure 6 is an end elevational view, partially broken away and in section of the chuck construction of Figure 5;

Figure 7 is a perspective view of a fixed locating finger adapted to be carried by the outer end face of the chuck of Figures 5 and 6;

Figure 8 is a fragmentary side elevational view, partially broken away and in section of a further modified chuck construction;

Figure 9 is an isometric view of the driving piston of the chuck of Figure 8;

Figure 10 is a side elevational view of one of the jaw actuating piston plungers of the chuck of Figure 8;

Figure 11 is a side elevational view of the piston of Figure 9 with one of the piston plungers of Figure 10 assembled therewith;

Figure 12 is a fragmentary side elevational view on a reduced scale taken substantially in the plane of line XII—XII of Figure 11; and Figure 13 is a side elevational view, partially in section of a modified center structure.

In one preferred form of the invention (Figs. 1 and 2) a chuck construction 10 is provided having means for gripping a work piece uniformly at equally spaced points about a perimeter in a self-compensating, automatic manner regardless of runout or out of roundness or eccentricity of the engaged perimeter of the work piece relative to a fixed center associated with the chuck. While the engaged perimeter of the work piece may be irregular or off center relative to the fixed center axis the chuck jaw gripping pressure at any point is uniform and may be of high pressure or thrust force without tendency to bite in or gouge high points or spots, or any tendency to force the work piece off center with respect to the aligned, coaxial center attained by engagement of the predetermined center point, depression, or projection of the work piece and the fixed center of the chuck structure.

To this end, the chuck 10 includes a body 12 which may be a metal block appropriately machined and cored or bored for the purpose. On its longitudinal axis, the chuck body 12 has an axial bore 12a therethrough within which is received or fitted an axially spaced pair of roller bearing units 13 by which the chuck body is rotatably supported upon a supporting shaft, mandrel or spindle 14. On its rear end the chuck body 12 is preferably formed with a reduced diameter concentric cylindrical portion 15 which may serve as a pulley or to which may be secured a pulley or gear member (not shown) by which the chuck body 12 may be operatively revolved by suitable driving means in a machine tool assembly such as a lathe or grinding machine or fixture.

On its rear end portion, the shaft 14 may be provided with an enlarged diameter section 14a, shown only fragmentally in Figure 1, which may be of any suitable length and is adapted to be secured fixedly in the frame or supporting means of the associated machine. On its forward end, the shaft 14 carries removably and thereby replaceably a fixed center or work-supporting pin member 16 which has a threaded shank 17 by which it is threadedly secured into a coaxial complementally threaded blind end bore opening from the shaft end. In the form shown, the center member 16 is provided with a conically shaped head or tip 18 providing a male center engageable within a female center depression in the end of a work piece 20 to be chucked.

For gripping and holding the work piece 20 on the center tip 18, the forward or outer face or end of the chuck body 12 carries a plurality of work-engaging jaw members 22 equally spaced about the axis of the chuck assembly. There may be two or more of the chuck jaw members 22, depending upon the size and structure of the work pieces to be chucked. Herein, three equidistantly spaced jaw members 22 are utilized.

Since it is necessary that the jaw members 22 be mounted for movement into and out of work-engaging relationship to one another and to the center tip 18, each of the jaw members includes a body portion 24 which is adapted to be slidably guided reciprocably for work engaging and backing-off movement. Moreover, since it is desirable to have the jaw units 22 readily interchangeable for accommodating a substantial range of work piece sizes, especially where relatively small production runs of different sizes occur with considerable frequency, the construction and relationship is such that the jaw bodies 24 serve as jaw carriers or supports to which are respectively attached as by means of screws 26 replaceable jaws members 28, each of which has a work gripping jaw nose or tip 29 at one end. Locating pins 30 carried by the jaw bodies 24 accurately orient each of the jaw members 28 with its carrier 24.

To enable fixed slidable reciprocable guiding of each of the jaw assemblies 22, the jaw carrier or bed member 24 is of generally inverted T-shaped transverse or cross-section to provide laterally projecting and longitudinally extending opposite side guide ribs 32. Respective radially extending guide grooves 34 are recessed into the outer or forward face of the chuck body 12 and are complementary in shape to the jaw beds or carriers 24, with undercut longitudinal base grooves 35 at the respective opposite sides to provide slideways for the guide ribs 32. By having the guide grooves or slots 34 run out at the respective outer ends thereof through the periphery of the body 12, the carriers 24 can be readily assembled into the grooves 34.

Pressure fluid operated means are provided for driving the jaw assemblies 22. To this end, an individual pressure fluid actuated plunger piston 36 is provided for actuating each of the jaw units. Each of the pistons 36 is preferably cylindrical and is slidably longitudinally guided in a cylindrical bore 38 in the chuck body 12 extending parallel to and spaced from the center bore 12a. Each of the cylinder bores 38 is blind at its inner or rear end and opens in aligned relation into the associated guide slot or groove 34 at the forward end of the cylinder. The blind end of the cylinder bore 38 in each instance provides a stop engageable by the distal end or tip of a reduced diameter concentric tail pin or stop extension 39 on the piston 36 whereby the full diameter forward or body portion of the piston is held in a predetermined forward position in the cylinder bore in the fully retracted condition of the piston. To effect a fluid seal between the piston 36 and the wall of the cylinder bore 38, sealing means such a sealing O-ring 40 mounted in a peripheral groove 41 adjacent the inner end of the full diameter portion of the piston 36 may be provided.

Fluid pressure such as oil for hydraulic actuation or air for pneumatic actuation of the pistons 36 in unison is provided by suitable means which includes a fluid passage 42 comprising a longitudinal bore from the rear or inner end of the shaft or spindle 14 and extending to a blind end short of the bore within which the center shaft 17 is secured. Thereby, the forward or blind end of the pressure fluid passage bore 42 is located in the assembly well within the rear portion of the chuck housing block or body 12 for intersection by a radially extending passage port 44 opening through the periphery of the shaft 14 into a space between a pair of axially spaced sealing ring members 45 about the shaft 14 at either side of the opening from the port 44 and held in place by the respective bearing assemblies 13. At their outer peripheries the sealing rings 45 sealingly engage the wall of the bore 12a at each side of a peripheral groove 46 in the wall of the bore 12a and of a depth to intersect and thus open into the respective cylinders 38 behind the large diameter portions of the pistons 36 and in the respective pressure chambers 47 defined about the tail stop portions 39. Through this arrangement, pressure fluid from a suitable source and under suitable valve control is delivered by way of the shaft passage 42, the port 44, the chamber between the seals 45, and the groove 46 into the respective cylinder pressure chambers 47. Within the pressure chamber 47, the fluid pressure acts against a rearwardly directed pressure face 50 on the full diameter portion of the respective jaw actuating piston 36 to drive the piston forwardly in the cylinder 38.

Fluid pressure forward or outward actuation of the pistons 36 acts by direct cam transmission to drive the jaw assemblies 22 toward chucking interengagement with the centered work piece 20. To this end, the forward end portion of each of the pistons 36 is provided with a tapered or beveled cam surface 52 which may, as shown, be 45° to the axis of the piston. A complementary cam shoulder 54 at the inner side of a rearwardly opening clearance recess 56 in the jaw carrier 24 cammingly coacts with the driving cam surface 52. Thus, in the full work gripping position of the jaw units 22, the relationship of the piston 36 to its jaw unit 22 is shown in dash outline, wherein the work-gripping noses 29 of the chuck jaws are in engagement with the work piece 20.

It will be appreciated that by virtue of each of the cylinders 36 being independently pressure fluid motivated, but from a comon pressure fluid source, with pressure fluid drivingly impressed in unison upon the pistons, the pistons act to drive the jaw units 22 with equal force. Moreover, should there be any eccentricity or out of round or other nonuniformity in the engaged surface of the work piece 20, the chuck jaw 22 that makes first contact will come to a stop without substantial pressure against the work piece until all of the other chuck jaws have made uniform contact with the work piece, whereupon the pressure builds up uniformly behind the pistons 36 to effect entirely uniform gripping pressure or thrust of all of the jaws upon the work piece. Thus, the chuck 10 is fully self-compensating as well as automatic.

In the present instance, spring bias means are provided for backing off or retracting the work-gripping jaw units 22 upon relief or release of the motivating pressure fluid. For this purpose, a coiled compression return spring 60 is seated within a blind end spring bore 62 opening from the inner end of each of the respective jaw carriers or body members 24. At the end which projects from the bore 62 the spring 60 thrusts against a sleeve or bushing member 64 nested concentrically within the forward end of the chuck body center bore 12a. It will be observed that the inner end portions of the chuck jaw carrier body members 24 are recessed as at 63 to clear the bushing 64, and by overhanging the outer end of the bushing serve to maintain the same against axially outward displacement. At their inner ends, the spring thrust bushing 64 seats against the housing of the forwardmost bearing assembly 13. Through this arrangement, promptly upon release of motivating press fluid behind the pistons 36, the jaw units 22 are snapped into retracted, full line position as shown in Figure 1 by action of the return springs 60. This enables rapid unloading and loading of the chuck with work pieces 20 to be finished or otherwise worked upon.

In slightly spaced clearance relation within the bushing 64 is a retaining washer member 68 which is clampingly secured to the forward end of the shaft 14 by the head of the center member 16. An outer peripheral groove in the washer member 68 carries an O-ring seal 70 which prevents leakage of lubricating fluid thereby from the adjacent bearing 13.

Limit upon retraction or back-off movement of the respective jaws 22 is provided for by a stop pin 72 in each instance that is threaded in an axial direction through the outer end portion of the jaw carrier or body 24 and has a stop end portion projecting into a stop recess 74 provided therefor in the forward face of the chuck body 12, the radially outer end of such recess providing a stop surface or abutment shoulder for this purpose. Desirably, a set screw 75 is provided to hold the limit pin fixedly, but removably in place. When it is desired to remove or replace the jaw body 24, removal of the stop pin 72, or at least retraction thereof to withdraw the stop end thereof out of the stop recess 74 enables sliding of the jaw body 24 from its guide groove 24. At this time, of course, the associated piston 36 is fully retracted into its cylinder 38 as seen in full line in Fig. 1, although during normal operating relationships, the piston may retract only to the extent forced by the stopped retraction of the jaw member as limited by the stop pin 72.

In the modification of Figures 3 and 4, an alternative form of chuck jaw 22' is provided especially suitable for engaging with a work piece 20' that has a recessed periphery, such as a reamer head that has a uniform series of generally longitudinally extending flutes 20a'. For this purpose, the general arrangement of the chuck jaw 22' may be much the same as the chuck jaw 22 of Figures 1 and 2. That is, a chuck jaw carrier or body member 24' to which is secured a chuck jaw member 28', although if preferred the body or carrier portion 24' and the jaw portion 28' may be made in one piece. Primed reference numerals in Figure 3 represent similar elements operating in the same manner as the correspondingly numbered elements in Figures 1 and 2.

In order to enable quick adjustment for a large variety of work piece sizes of the kind having recess periphery engageable by the chuck jaws, the chuck unit 22' is provided with a pin-like work-gripping member 78 which is slidably mounted within a longitudinal complementary bore 76 in the jaw member 28', and with the work-gripping end portion of the gripping pin projecting from the inner end of the jaw member oriented toward a common center point relative to the gripping pins of the companion chuck units 22'. A retaining set screw 80 may be provided threaded into the side of the jaw member 28' and is engageable at its inner tip within a selected one of a series of transverse, longitudinally spaced calibrated locating or adjustment recesses 82 in the side of the pin 78. The calibrated recesses 82 may be of graduated spacing or equal spacing, as preferred. Knowing the size of the work piece to be handled by the chuck, it is therefore a simple matter to adjust the gripping nose pins 78 to that projecting relation to the jaw member 28' which will effect just the right clearance in the backed off relation of the chuck jaws to enable removal and loading of the chuck efficiently and with minimum lost motion.

Effective gripping of the recessed-periphery work piece with freedom from marring is attained by having the gripping noses or tips of the gripping pins 78 smoothly rounded off as for example to a semi-spherical configuration as at 86. Hence, when the work piece such as the reamer 20' has been centered by registration of a head end locating recess 20b' on the centering tip of the fixed center of the chuck, the pressure fluid motivated actuating system of the chuck is operated to drive the respective chuck finger tips 86 into firm retaining engagement in respective flute grooves 28' of the reamer head. It will be appreciated that only moderate pressure on the chuck jaws is adequate to effect positive, non-slipping engagement with the reamer head since the chuck jaw tips 86 are actually interlocked with the reamer head in the flute grooves 28'. Hence, any danger of chipping or otherwise damaging the cutting ribs or edges of the reamer is avoided.

In the modified chuck construction of Figures 5 and 6, a somewhat simplified and more versatile embodiment of the invention is shown. To this end, a machine tool chuck 90 includes a preferably cylindrical body block 91 having an axial bore 92 therethrough within which is mounted a pair of coaxial spaced apart annular roller bearing assemblies 93 by which the chuck body is rotatably supported upon a spindle or shaft 94. At its forward end, the shaft 94 carries a fixed stop member in the form of a stud 95 which may be replaceably mounted in the forward end of the shaft 131, similarly as the center 16 of Figures 1 and 2 is mounted in the shaft 14. While the member 95 may be provided with a fixed or dead center 96, it preferably in this instance serves as a stop for centerless work pieces.

On its forward face, the chuck block 91 carries a plurality of chuck jaw assemblies 97. Each of the chuck jaw structures 97 includes a body member or carrier 98 having opposite longitudinal laterally projecting base marginal side guide ribs 99 slidably engaged within respective undercut guide grooves 100 provided at the sides of the bottom of a respective radially extending jaw guiding recess or slot 101 provided for each of the chuck jaws in the outer or forward end face of the chuck body 91.

On its outer longitudinal face, the chuck jaw body 98 in each instance has entirely thereacross a longitudinal groove 102 of substantial width and preferably centered and within which is mounted fixedly but replaceably a jaw nose or finger member 103 secured in place by means such as a screw 104 and held against turning about the axis of the screw by interengagement with the side walls defining the seat groove 102. At its working end, the gripping jaw finger 103 projects a predetermined distance radially inwardly beyond the radially inner end of the jaw body 98 toward the axis of the chuck. Shear stress is relieved from or avoided relative to the screw 104 by the provision of an undercut shoulder 105 on the jaw finger member 103 engaging against the opposing inner end corner margin of the jaw body 98.

In order to enable each of the jaw fingers 103 to accommodate with maximum efficiency work of substantially different size, the finger is preferably provided with respective work engaging tips 107 and 108 at its opposite ends. One of the gripping tips 107 and 108 is longer than the other, this being shown herein as the tip 107, as related to a screw hole 109 through which the retaining screw 104 extend. It will be observed that an undercut or inset thrust shoulder 110 is provided on the face of the jaw finger 103 opposite to the face that has the thrust shoulder 105, and that the shoulder 110 is spaced from the extremity of the gripper tip or nose 108 an appropriate shortened distance, as compared to the distance the shoulder 105 is spaced from the extremity of the gripping tip 107, to engage the opposing shoulder at the inner end of the jaw body 98 when the shorter tip 108 is to be used. Thus, by the simple expedient of removing the securing screw 104 in each instance, the jaw finger 103 can be reversed and a set-up provided for handling a different size of work piece. Obviously, also, the gripping fingers 103 of any set may be replaced entirely by similar gripping fingers of still other work-dimension capacities, as desired.

By having the jaw fingers or grippers 103 readily changeable and replaceable, it is also possible to provide work engaging tips that are best suited for gripping any given type of work piece. For example, for some types of work it may be desirable to have rather narrow tips on the working ends of the jaw fingers 103, while for other types of work it may be desirable to have the jaw finger tips wider. This is demonstrated in Figure 6 wherein it will be observed that the jaw finger tips 107 are narrower than the jaw finger tips 108.

For purposes of illustration, only one of the jaw units 97 has been shown in full line in each of Figures 5 and 6, but it will be appreciated that a plurality of the same units will be used, one for each of the guide slots 101.

Pressure fluid operated actuating means are provided for driving the jaw units 97 into work gripping relation. To this end, a plunger piston 111 is provided for each of the jaw units and comprises a cylindrical body reciprocably mounted within a respective cylinder bore 112 that opens in registration into the respective associated jaw guide slot 101 in the chuck body 91. For cam action transmission of force, the forward or outer ends of the piston 111 is provided with a cam driving surface 113 engageable with a cam shoulder 114 provided by the inner edge defining a clearance recess 115 in the inner longitudinal face of the jaw body 98.

Normally the working tip extremity of the plunger piston 111 projects forwardly into intercepting relation to the cam shoulder 114 against which the jaw body 98 is normally biased by means such as a coiled compression biasing spring 117 housed within a suitable blind end bore 118 opening from the outer periphery of the chuck body 91 in spaced parallel relation to one side of the jaw guide slot 101. The spring 117 bottoms on the blind end of the bore 118 and at its opposite end thrusts under compression against a lateral thrust boss or arm 119 projecting from the adjacent side of the jaw body 98 and accommodated within a clearance slot 120 connecting the spring housing bore 118 with the guide recess 101. Thereby, the jaw assembly 97 is normally biased radially outwardly, that is into backed-off position and this maintains the motion transmission shoulder 114 of the jaw in operative engagement with the transmission cam 113 of the associated plunger piston 111.

In the particular arrangement shown in Figure 5, the chuck jaw actuating piston plungers 111 are attached to and motivated in unison by an annular master piston 121 which is axially reciprocably housed within an annular master cylinder 122 disposed within the inner or rear end portion of the chuck body 91 in concentric spaced relation to the center bore 92, in communicating registration with the plunger piston bores 112 and opening through the rear extremity of the chuck body 91.

Individual attachment of the piston plungers 111 to the master piston 121 may be effected by means of a respective integral axial reduced diameter tail stem 123 on the plunger piston extending through an axially extending bore 124 in the master piston, and with means such as a securing nut 125 threadedly engaging the distal end portion of the tail stem and having the opposing shoulder of the plunger rigidly against the master piston, with a sealing ring 126 preventing fluid leakage through the joint. The tail stem 123 and the nut 125 provide a rear end stop for the piston assembly projecting a predetermined distance rearwardly beyond the inner face of the master piston 121 and engageable against a rear closure plate 127. Means for removably securing the closure plate 127 may comprise dowel locating pins 128 and attachment screws 129. Through this arrangement, the piston assembly can be assembled with the chuck body 91 from the rear thereof and the closure plate 127 then secured in place. Centrally the closure plate 127 is bored to clear the supporting shaft 94 therethrough.

After the closure plate 127 has been secured in place on the chuck body 91, the chuck body and the parts of the assembly carried thereby is adapted to be assembled upon the supporting shaft 94 by axially sliding relative assembly movement until the rear face of the closure plate 127 engages against a stop shoulder 130 provided by an enlarged diameter rear end portion 131 of the supporting shaft. Then, a washer member 132 is applied to the forward end of the shaft 94 in generally retaining relation to the adjacent bearing assembly 93 and in close peripheral relation to the wall defining the forward end portion of the chuck body bore 92. Lastly the center member 95 is secured in place on the forward end of the shaft 94 and clamps the retaining washer member 132 in place. For preliminarily holding the bearing assembly against longitudinal displacement incident to assembly of the chuck body on the shaft 94, a split ring 133 may be seated within a suitable recess groove in the wall defining the bore 92.

Pressure fluid for driving the master piston 121 forwardly in the master cylinder 122, and thereby driving the plunger pistons 111 in a jaw closing stroke, is derived from any suitable source under suitable valve control and is delivered into a delivery duct or passage comprising a longitudinally extending bore 134 in the shaft 94 opening thereinto as through a connector or nipple receiving counterbore 135 at the rear end of the shaft. Adjacent to the blind forward end of the passage duct 134 an intersecting port bore 137 opens therefrom through the periphery of the shaft 94 into an annular chamber defined between a pair of axially spaced sealing ring members 138 located in the space between the shaft 94 and the chuck body bore 92 and the pair of bearing assemblies 93. For conveying the pressure fluid from the annular seal chamber, a suitable plurality of pressure fluid duct passages or bores 139 are provided in the chuck body 91 and communicate through a rear end bevel 140 with the pressure chamber portion of the cylinder 122 behind the master piston 121. Through this arrangement, pressure fluid is delivered for driving the master piston 121 in a chuck jaw closing stroke and maintaining the master piston in the chuck jaw closing relation continuously as long as desired while the chuck body 91 may be rotatably driven relative to the shaft 94 by any suitable means such as a gear or pulley (not shown) attached to the closure plate 127 about the enlarged diameter portion 131 of the supporting shaft.

Since it is desirable to have sealing means to prevent leakage of pressure fluid, such as respective O-rings 141 and 141a in the peripheries of the master cylinder 121 and respective O-rings 142 about the peripheries of the plunger pistons 111, there may be greater resistance to return of the piston assembly during back off of the chuck jaws than can be overcome by the return compression springs 117. Therefore, suitable piston return means are provided which may, of course, be in the form of return springs acting upon the master piston 121, but for more rapid and positive action pressure fluid return means are preferably provided. To this end, a piston return pressure fluid duct bore 143 is provided, longitudinally in the rear end portion of the supporting shaft, receptive of pressure fluid from suitable source through an inlet 144. The duct or passage 143 communicates through a lateral port 145 at the periphery of the shaft 94 between a pair of axially spaced sealing rings 146 with a communication groove 147 in the wall of the central bore of the closure plate 127 about the shaft. From the groove 147 the piston-return pressure fluid is conducted through a suitable plurality of duct bores or passages 148 in the closure plate 127 communicating with suitable passage duct bores 149 in the chuck body 91 which discharge through ports 150 into the forward or inner end portion of the master cylinder 122. Since the pressure of the fluid for returning the piston assembly is substantially less than desirable for the chuck closing stroke of the piston, it is feasible to effect delivery of the piston-return pressure fluid as described without danger of leakage, especially from between the joint between the closure plate 127 and the back of the chuck body. In any event, such leakage can be easily precluded by the provision of a thin sealing gasket in such joint.

Sometimes work must be handled which does not have an engageable center but which should be accurately located for engagement by the chuck jaws. In such event the chuck may be equipped with fixed centering fingers such as the finger 155 shown in Figure 7, provided with a centering tip 157. On the outer or forward face of the chuck body 91 provision may be made equidistantly between the chuck jaw guide slots 101 for selectively attaching a set of the fixed centering fingers 155, substantially in operative position as indicated in dash outline in Figure 6. For this purpose, pairs of radially aligned threaded screw holes 158 may be provided in the front face of the chuck body 91, receptive of attachment screws (not shown) that are adapted to extend through suitable screw holes 159 in the body of the centering finger. When in place, the diameter described about the extremities of the tips 157 will be such as to engage and accurately support the work piece for pressure engagement by the tips 107 of the chuck jaw fingers 103.

In Figures 5 and 6, the plunger pistons 111 and the master piston 121 are, of course, operable as a rigid unit, so that unison coextensive travel of the jaw units 97 in closing and back-off movements is effected. However, exactly the same chuck structure with respect to the chuck body and the chuck jaws, as well as the manner in which the chuck body is rotatably related to and supported by the supporting, center-carrying, pressure-fluid system providing shaft, may be used in a chuck assembly embodying master piston operation of the driving plunger pistons but providing for self-compensating, automatically adjustable operation of the chuck jaws to attain the same results as where individually motivated driving piston plungers are used as in the form of Figures 1 and 2. To this end, the modification of the invention variously depicted in Figures 8 through 12 may be utilized. In this form of the invention, all common elements or parts of a chuck assembly 160 that are substantially the same or identical with like elements or parts in the chuck 90 have been identified by similar, primed, reference numerals. This enables a high degree of standardization with the only major changes being in the plunger pistons and in the master piston, and in this respect either the rigidly joint plunger piston operation or self-compensating or adjusting form may be used interchangeably in the otherwise standard chuck assembly.

Accordingly, in the chuck 160, jaw driving piston plungers 161 are provided to operate reciprocably in the piston bores 112'. On each of the piston plungers 161 a force transmitting cam end surface 162 engages with an engagement and thrust shoulder 114' of the jaw body 98' to the same effect and for the same purpose as the shoulder 114 in Figure 5.

At their inner or rear end portions, the plunger pistons 161 are connected in articulated fashion to an axially self-adjustable annular master piston 163 which is axially reciprocably mounted within the master cylinder 122'. By having the inner and outer diameters of the master piston 163 in differential, spaced relation to the opposing inner and outer diameters respectively of the master cylinder 122', the master piston 163 is enabled to assume infinitely variable canted positions within a substantial operative range in the master cylinder 122'. That is, when pressure fluid is impressed behind the master piston 163, although it normally tends to urge the master piston uniformly axially forwardly in the master cylinder, any resistance encountered at any point on the master piston causes the associated portion of the master piston to lag in movement while the remainder of the master piston continues to move forwardly. For example, in Figure 11 the master piston 163 is shown in a normal plane to the axis of the piston plunger 161 in the full line illustration while in a dash position the opposite side of the master piston from the plunger piston is canted forwardly and in dot dash outline the reverse condition, namely, a rearwardly canted position is shown. O-ring seal members 164 and 165 in respectively the outer and inner perimeters of the master piston 163 effect sealing engagement with the walls of the master cylinder 122'.

A simplified, efficient articulated connection between the plunger pistons 161 and the master piston 163 is provided by equipping each of the plunger pistons with a foot 167 connected to the main body of the plunger piston by a reduced diameter central stem 168 providing an annular groove of substantial depth in the base end portion of the plunger piston. Thereby, connection of the plunger piston is effected with the master piston by inserting the connecting foot 167 into an inverted T-shaped slot 169 provided therefore in the forward face of the master piston and running out at the inside and outside diameters thereof. The maximum width of the groove 169 between the undercut groove portions thereof is slightly less than the maximum diameter of the foot 167 which is provided with opposite parallel flats 170 parallel to an axial plane normal to the force transmission wedge-cam surface 162 and engageable with the opposing walls defining the undercut groove portions so as to hold the plunger pistons against any substantial turning during assembly. This maintains the cam surfaces 162 in the proper relationship or attitude for engagement with the jaw shoulders 114'.

In order to enable a substantial amount of universal rocking or canting movement of the master piston 163 relative to the plunger pistons 161 in operation, the plunger pistons being held to straight axial reciprocal movement within the cylinder bores 112', the width of the groove about the connecting stem 168 is wider than the overhanging lips that define the portions of the slots 169 that open through the forward face of the master piston 163. In addition, the thickness of the foot 167 is less than the depth of the undercut portions of the grooves 169. Furthermore, the bottom or groove-bottom-engaging face of the foot 167 is preferably rounded off semi-spherically as shown at 171 so that although direct thrust contact is had between the foot face 171 and the master piston in the bottom of the associated groove 169, free relative rocking movement is accommodated even during powerful pressure fluid generated thrusting force. The opposite or master piston groove lip opposing face of the foot 167 is similarly rounded as at 171a. Preferably, the shoulder on the inner end of the plunger piston 161 adjacent to the stem 168 is also rounded off as at 172 in order to afford rocking clearance while nevertheless enabling shouldering of the rounded shoulder 172 against the adjacent forward face of the master piston 163 at the extremes of respective safe rocking limits of the master piston. In other words, overrocking of the master piston and thus possibly jamming thereof within the cylinder 122' is thereby avoided.

In operation of the chuck 160, driving pressure fluid introduced behind the master piston 163 acts normally to drive the master piston forwardly uniformly and uncanted. Thereby, the plurality of plunger pistons 161 connected to the master piston are normally moved in the driving stroke with uniform acceleration and thus act through the power transmission cam faces 162 thereof to actuate the jaw assemblies 97' with uniform acceleration and thrust toward closing relation to grip a work piece supported on the dead center 96'. However, should something obstruct movement of any one or more of the jaw assemblies 97' in its movement toward jaw closing or gripping position, so that resistance to closing movement is encountered, the master piston 163 will yield to the back pressure and either slow down or stop in the portion thereof engaged by the back-pressured or stopped plunger piston or pistons 161, while the remaining portion of the master piston continues to move forwardly under pressure fluid impulse by canting of the master piston as described in connection with Figure 11 for thereby continuing to drive the remaining plunger piston or pistons and thus the associated chuck jaw or jaws. This action continues until a quite uniform, equalized pressure thrust or grip of the chuck jaws on the work piece is attained and then held during continuance of jaw-closing pressure fluid force on the master piston. It will be appreciated that this feature of self-adjustment of the chuck jaws but equalized final gripping pressure is highly advantageous when out of round, non-uniform or unequal surfaced work pieces are chucked.

Positive back-off or return or retraction of the chuck jaw assemblies 97' is effected in the chuck 160 similarly as in the chuck 90 not only by the return springs 117' but also by return pressure fluid admitted to the cylinder 122' in front of the master piston 163 through the return pressure fluid system including the passages 148', 149' and port 150'.

Since sometimes it is necessary to have a chuck that will handle hollow work which must be gripped by engaging an inside diameter or cavity wall, means may be provided for utilizing the same chuck body or head and by reversing the chuck jaws, so as to have radially outward gripping thrust, accommodate such work. To this end, having reference to Figure 6, it will be apparent that the chuck jaw body members 98 may be mounted within the respective guide slots 101 with their gripping jaw end portions directed radially outwardly as well as radially inwardly as shown. By way of example, at the lower left side of Figure 6 is shown in dash outline how one of the chuck jaw units 97 may be mounted for internal chucking of a work piece. Such operation of the chuck jaws can be readily accommodated by the present invention since it is a simple matter to mount the jaw actuating plunger pistons 111 of Figures 5 and 6 or the plunger pistons 161 of Figure 8 in the reversed position from that shown, that is, with the power transmission thrust cam surfaces thereof facing radially outwardly instead of radially inwardly. As thus repositioned operation of the respective chucks will be the same as described for external chucking of work pieces. The same comments hold true for the fixed centering fingers 155 which may be mounted for internal work engagement as well as external work engagement, being directed with the engagement tips 157 radially outwardly for internal work chucking purposes.

In order to accommodate the return springs 117 when the chuck jaw units 97 are reversed for internal work chucking, the chuck body or head 91 is preferably provided adjacent the inner ends of the guide slots 101 with blind end return spring socket bores 175 parallel thereto and spaced therefrom similarly as the spring socket bores 118 and communicating laterally with the guide grooves by way of respective lateral clearance slots 177, as in Figure 6.

As an example of a female center that may be used in place of the male centers 16 or 95, a female center 180 is shown in Figure 13. This is equipped with a threaded shank or stem 181 for securing the same into the end of the support and center shaft. At its opposite end the center member 180 is provided with a center nose 182 having a centering recess or socket 183 in its tip to receive a male center projection of a work piece.

While the centers shown in association with the chucks 10 and 161 are of the fixed type, they could, as well, be of a rotary type. Thereby the centers would rotate with the work piece gripped by the chuck jaws.

It will be appreciated, of course, that the several modifications in the chuck jaw structures disclosed, may be adapted for or interchangeably used in any of the chuck assemblies or units depicted. In other words, the chuck jaw assembly 22 may be utilized in the chucks 90 and 160, or on the other hand the chuck jaw assembly 97 may be used in the chuck 10, or the chuck jaw 22' may be used in either of the chuck assemblies, as preferred. In this respect, it is of course, the gripping fingers of the chuck jaws that would be the deciding factor as to which general form of the jaw structure would be preferred in any instance.

Since in the self-compensating forms of the chuck 10 or 160, the chuck jaws in response to the wedging drive by the individual axial piston plungers make individual self-adjusted contact with the work pieces so that as any one of the jaws contact the work piece it stops without exerting any appreciable force until all of the rest of the jaws are in gripping position, the chuck jaws do not require preadjustment, nor shut-down for adjustment or regrinding, for runout or eccentricity in the work or for compensating for wear in the jaw fingers or possibly wearingly coactive parts such as the wedging cam drive transmission between the piston plungers and the jaw bodies. This also enables safe use of high jaw pressures. However, where low jaw pressures must be used due to the character of the work, uniform gripping is nevertheless assured.

It will be understood that modifications and variations may be effected without departing from the scope of the novel concepts of the present invention.

I claim as my invention:

1. In a chuck assembly including a supporting shaft adapted to be mounted fixedly in a machine tool structure, a chuck head rotatably mounted on said shaft and carrying means for rotating the chuck head and the fixedly mounted shaft and a plurality of reciprocable work gripping jaws coactive to grip a work piece, said shaft carrying a dead center device about which said head rotates and adapted for holding a work piece on a fixed center and engageable by said jaws, and means carried by said chuck head for actuating said jaws to grip the work piece as centered by said dead center device.

2. In a chuck assembly including a supporting shaft adapted to be mounted fixedly in a machine tool structure, a chuck head rotatably mounted on said shaft and carrying means for rotating the chuck head about the fixedly mounted shaft and a plurality of reciprocable work gripping jaws coactive to grip a work piece, said shaft carrying a dead center device about which said head rotates and adapted for holding a work piece on a fixed center and engageable by said jaws, and means carried by said chuck head for actuating said jaws to grip the work piece as centered by said dead center device, said actuating means and said jaws coacting for self-compensation of the jaws for eccentricities in the work piece.

3. In a chuck assembly including a supporting shaft adapted to be mounted fixedly in a machine tool structure, a chuck head rotatably mounted on said shaft and carrying means for rotating the chuck head about the fixedly mounted shaft and a plurality of reciprocable work gripping jaws coactive to grip a work piece, said shaft carrying a dead center device about which said head rotates and adapted for holding a work piece on a fixed center and engageable by said jaws, and means carried by said chuck head for actuating said jaws to grip the work piece as centered by said dead center device, said actuating means including a pressure fluid system supplied through passage duct means in said shaft.

4. In a chuck assembly including a supporting shaft adapted to be mounted fixedly in a machine tool structure, a chuck head rotatably mounted on said shaft and carrying means for rotating the chuck head about the fixedly mounted shaft and a plurality of reciprocable work gripping jaws, said shaft carrying a dead center device for holding a work piece on a fixed center and engageable by said jaws, means carried by said chuck head for actuating said jaws to grip the work piece as centered by said dead center device, said actuating means comprising individual plunger pistons having wedging cam power transmission coaction with said jaws, and means for driving said pistons simultaneously, each piston capable of driven movement relative to the other pistons for individual compensation with respect to gripping of the work piece by the respective jaws.

5. In a chuck assembly including a supporting shaft adapted to be mounted fixedly in a machine tool structure, a chuck head rotatably mounted on said shaft and carrying means for rotating the chuck head about the fixedly mounted shaft and a plurality of reciprocable work gripping jaws, said shaft carrying a dead center device for holding a work piece on a fixed center and engageable by said jaws, and means carried by said chuck head for actuating said jaws to grip the work piece as centered by said dead center device, said actuating means comprising a plurality of individual driving plunger pistons coactive with the respective jaws and a master piston operative to actuate the plunger pistons simultaneously, each piston capable of driven movement by the master piston relative to the other pistons for individual compensation with respect to gripping of the work piece by the respective jaws.

6. In a machine tool chuck assembly, a supporting shaft, a chuck head rotatably mounted on and relative to said supporting shaft, reciprocable work gripping jaws carried by said chuck head, presure fluid operated means for actuating said gripping jaws including a pressure fluid system with fluid duct means in said shaft and said chuck head and fluid pressure responsive actuating piston structure carried within said chuck head, and means effecting pressure fluid connection of the duct means in the shaft with the duct means in the chuck head in all relative rotary positions of the chuck head on the shaft.

7. In a machine tool chuck assembly, a supporting shaft, a chuck head rotatably mounted on said supporting shaft, reciprocable work gripping jaws carried by said chuck head, and pressure fluid operated means for actuating said gripping jaws including a pressure fluid system with fluid duct means in said shaft and said chuck head and fluid pressure responsive actuating piston structure carried within said chuck head, said chuck jaws being reversible for alternative external and internal work gripping and said piston structure being reversible to accommodate the reversibility of the chuck jaws.

8. In a machine tool chuck construction including a shaft with a rotary chuck body mounted thereon, said chuck body having on the forward face thereof a plurality of inverted T-shaped generally radial guide slots, chuck jaws having generally inverted T-shape cross-section body portions slidably mounted in said slots, said chuck body having generally axially extending cylinder bores opening into said slots, individual jaw actuating plunger pistons slidably reciprocably mounted in said cylinder bores, said chuck body having an annular master cylinder chamber into which the inner ends of said cylinder bores open, an annular pressure fluid responsive master piston in said master cylinder connected to the inner end portions of said plunger pistons for actuating the latter, and a pressure fluid supply system in said chuck body communicating with said master cylinder and including pressure fluid supply passages opening into the master cylinder behind the master piston for jaw closing actuation of the master piston and fluid passage means opening into the master cylinder in front of the master piston for driving the latter in a return stroke.

9. An automatically adjustable work gripping chuck, comprising a chuck body provided with an axial bore, a shaft supporting said body within said bore for rotation about the shaft, jaws carried by said body for controlled generally radial movement, fluid pressure responsive means with pressure cylinder means provided in said chuck body for actuating said jaws, and means supplying pressure fluid to said pressure responsive means to drive the same, said supplying means including a passageway provided longitudinally in said shaft and an intersecting radially extending port leading from said shaft to communicate pressure to said bore in the chuck body, said chuck body being provided in said bore with an annular groove intersecting said pressure cylinder means to supply pressure fluid thereto.

10. A work gripping chuck, comprising a chuck body, jaws carried by said body for generally radial movement with respect thereto, said chuck body having fluid pressure responsive means associated with each jaw to cause the jaw to move radially with respect to the chuck body, the chuck body being provided with an axial bore, a sleeve-like member mounted in said bore and extending into the path of movement of said jaws, and return spring means disposed between said jaws and said sleeve member to bias the jaws normally radially outwardly.

11. In combination in a chuck assembly, a chuck head having radially extending jaw guiding grooves, chuck jaws reciprocably supported on the chuck head in said grooves and being reversibly mounted therein to adapt the jaws for inside chucking of work pieces when urged toward the outer side of the chuck head and for outside chucking of work pieces when urged toward the inside of the chuck head, means for actuating said jaws reciprocably in said grooves, and jaw return-spring means alongside of respectively opposite end portions of the grooves in said head for accommodating alternative outside and inside chucking operation of said jaws.

12. In a machine tool chuck assembly, a chuck body, jaws carried reciprocably by the body, jaw operating plungers reciprocably guided in fixed cylinders in the chuck body, said fixed cylinders connecting at their ends remote from the chuck jaws with a master cylinder, a master piston in said master cylinder and cantingly movable therein, means for pressure fluid operation of said master piston, and rockably articulated connections of the master cylinder with the respective plungers.

13. In a machine tool chuck assembly, a chuck body having a forward face provided with radial guide means oriented toward a common center point, radially reciprocable chuck jaw body members in said guide means, means for reciprocably actuating said jaw body members, means on said jaw body members including axially extending bores therein with work gripping rod-like fingers projecting therefrom and adjustable as to length longitudinally in said bores, said fingers having rounded work engaging tips directed toward said center point and adapted to engage recessed periphery work pieces such as fluted reamers in respective peripheral recesses thereof to maintain the work pieces concentric with said center point, and means on the body members and the fingers for securing the fingers in selected adjusted longitudinal positions relative to the jaw body members in order to accommodate different sizes of work pieces.

References Cited in the file of this patent

UNITED STATES PATENTS

| | | |
|---|---|---|
| 1,161,490 | McKinney | Nov. 23, 1915 |
| 1,786,147 | Bullard | Dec. 23, 1930 |
| 1,815,562 | Godfriaux | July 21, 1931 |
| 1,881,905 | Page et al. | Oct. 11, 1932 |
| 2,191,371 | Church | Feb. 20, 1940 |
| 2,505,007 | Rolland | Apr. 25, 1950 |
| 2,523,374 | Jensen | Sept. 26, 1950 |
| 2,573,403 | Church | Oct. 30, 1951 |
| 2,597,280 | Barnes | May 20, 1952 |
| 2,607,603 | Breuer et al. | Aug. 19, 1952 |
| 2,655,384 | Peterson | Oct. 13, 1953 |
| 2,703,242 | Sloan et al. | Mar. 1, 1955 |
| 2,759,735 | Cross | Aug. 21, 1956 |
| 2,794,648 | Sampson | June 4, 1957 |